3,297,606
POLYMERIC REACTION PRODUCTS DERIVED FROM POLYHALOPOLYHYDRODIMETHANO-NAPHTHALENE DICARBOXYLIC ACIDS OR ANHYDRIDES THEREOF

Morris Dunkel, Paramus, N.J., assignor to Universal Oil Products Company, Des Plaines, Ill., a corporation of Delaware
No Drawing. Filed Dec. 30, 1963, Ser. No. 334,567
7 Claims. (Cl. 260—22)

This application is a continuation-in-part of my copending application, Serial No. 271,873, filed April 10, 1963, now abandoned.

This invention relates to polymeric compositions of matter and more particularly to polymeric compositions of matter containing, as one component thereof, a polyhalopolyhydrodimethanonaphthalenedicarboxylic acid or anhydride thereof.

The polymeric compositions of matter which are prepared according to the process of this invention and which comprises the reaction product of at least one reactive polyfunctional organic intermediate and a polyhalopolyhydrodimethanonaphthalenedicarboxylic acid or anhydrided thereof will possess many particular and desired physical properties which will make these particular compounds desirable and commercially attractive. For example, the plastic compositions of matter which may be prepared when reacting one or more reactive polyfunctional organic intermediates hereinafter set forth in greater detail, with a sufficient amount of the polyhalopolyhydrodimethanonaphthalenedicarboxylic acid or anhydride thereof will possess fire-retardant properties. This property is especially advantageous when preparing plastic materials which will be utilized in places which may be subject to excessive heat or possible flame such as architectural panels for construction work, wall plugs for electrical connections, ash trays, etc. In addition, the polyhalopolyhydrodimethanonaphthalenedicarboxylic acid or anhydride thereof when used as a constituent of paints, lacquers, varnishes or in polymers which in turn, are used as protective coatings, films, etc. will impart the fire resistance to these compounds and, therefore, render them commercially attractive as articles of commerce. It is also contemplated that the aforementioned polyhalopolyhydrodimethanonaphthalenedicarboxylic acids or anhydrides thereof due to the particular structure of the molecule may also be used as a constituent in articles in which flame-retardency is required and the discoloration which results from the addition of certain chlorine containing flame retardants is an adverse and undesired side effect. The acid or anhydride due to its stability and resistance to deterioration will thus make it an attractive constituent of plastic materials which are colorless and should remain so, or which are colored and will not darken.

The color stability of products derived from polyhalopolyhydrodialkanonapthalenedicarboxylic acids and anhydrides thereof compared with similar compounds would not be expected based on current theoretical reasoning. Because alkylated cyclohexanes are known to undergo autoxidation readily, it might be predicted that polyhalohydrodialkanonaphthalenedicarboxylic acids and anhydrides thereof would be rapidly attacked by atmospheric oxygen and susceptible to free radical reactions catalyzed by light. Such attack should lead initially to hydroperoxide formation at the various ring junctions as well as at the positions alpha to the carboxyl groups. Decomposition of the hydroperoxides would lead to formation of alcohols, ketones, olefins, ring opening and further attack on the susceptible methylene carbon atoms. The products of these reactions which might be aromatic compounds, quinones and condensed materials would liberate hydrogen chloride and form highly colored products.

The reason that these processes fail to occur with polyhalohydrodialkanonaphthalenedicarboxylic acids and anhydrides thereof has not been proven at this time.

In addition to the aforementioned properties of color stability and flame retardency which the polyhalopolyhydrodimethanonaphthalenedicarboxylic acids or anhydrides thereof possess, the acids or anhydrides are soluble to an unexpected extent in the other reactants of the type hereinafter set forth in greater detail. This solubility was, as hereinbefore set forth, unexpected in view of the fact that a tricyclicpolyhalopolyhydrodicarboxylic acid or anhydride is relatively insoluble in some of the reactants which are utilized along with the acid or anhydride to prepare certain polymeric compositions of matter. This solubility is advantageous in many instances when the use of the acids or anhydrides of the type utilized in the present invention are admixed with certain other reactants to form the desired polymers, said admixture being accomplished at relatively lower temperatures.

It is therefore an object of this invention to provide novel compositions of matter which possess desirable properties of flame-retardancy and high color stability.

Another object of this invention is to provide novel compositions of matter by reacting certain organic compounds with a polyhalopolyhydrodimethanonaphthalenedicarboxylic acid or anhydride thereof to prepare compounds possessing valuable physical properties.

Taken in its broadest aspect, one embodiment of this invention resides in a composition of matter comprising the reaction product of at least one reactive polyfunctional organic intermediate with a compound selected from the group consisting of polyhalopolyhydrodimethanonaphthalenedicarboxylic acids and anhydrides thereof.

Another embodiment of this invention is found in a composition of matter comprising the reaction product of at least one reactive polyfunctional organic intermediate and 5,6,7,8,9,9 - hexacholor - 1,2,3,4,4a,5,8,8a-octahydro-1,4,5,8-dimethano-2,3-naphthalenedicarboxylic anhydride.

Yet another embodiment of this invention is found in a composition of matter comprising the reaction product of at least one glycol, a compound selected from the group consisting of unsaturated dibasic acids and anhydrides thereof, a vinyl monomer, and 5,6,7,8,9,9 - hexachloro - 1,2,3,4,4a,5,8,8a - octahydro - 1,4,5,8 - dimethano - 2,3 - naphthalenedicarboxylic anhydride.

A specific embodiment of this invention resides in a composition of matter comprising the reaction product of ethylene glycol, diethylene glycol, maleic acid, styrene and 5,6,7,8,9,9 - hexachloro - 1,2,3,4,4a,5,8,8a - octa - hydro - 1,4,5,8 - dimethano - 2,3 - naphthalenedicarboxylic anhydride.

Other objects and embodiments will be found in the following further detailed description of this invention.

As hereinbefore set forth, the present invention is directed to polymeric products or compositions of matter in which one of the elements contained therein comprises a polyhalopolyhydroimethanonaphthalenedicarboxylic acid or anhydride thereof, this compound imparting desired physical properties to the finished product. The polyhalopolyhydrodimethanonaphthalenedicarboxylic acid or anhydride thereof may be prepared by condensing a conjugated cycloalkadiene with an unsaturated dicarboxylic acid or anhydride in a Diels-Alder type condensation at an elevated temperature in the range of from about 80° up to about 250° C. or more and at a pressure sufficient to maintain a major portion of the reactants in the liquid phase, said pressures usually being in a range of from about atmospheric to about superatmospheric or more. In addition, if so desired, the condensation may be effected in the presence of an inert organic solvent including aromatic solvents such as benzene, toluene, the xylenes, etc.; acyclic and cyclic paraffins such as pentane, hexane, heptane, cyclopentane, methylcyclopentane, etc. Examples of conjugated cycloalkadienes which may be used include 1,3-cyclopentadiene (hereinafter referred to as cyclopentadiene), 1,3-cyclohexadiene, etc. Olefinic dicarboxylic acids which may be used include maleic acid, fumaric acid, itaconic acid, citraconic acid, maleic anhydride, etc. The resultant bicyclic dicarboxylic acid or anhydride thereof is then further condensed with a halogenated cycloalkadiene, said condensation also being of the Diels-Alder type. This condensation is effected at elevated temperatures in the range of from about 50° up to about 250° C. or more, the preferred range being from about 100° to about 200° C. and at atmospheric or superatmospheric pressures ranging up to about 100 atmospheres or more, the pressure again being sufficient so as to maintain a major portion of the reactants in the liquid phase at the particular temperature at which the condensation is effected. As in the first condensation, the second condensation may also be effected in the presence of an inert organic solvent of the type hereinbefore set forth. Examples of halo substituted cycloalkadienes which may be used include chloro-substituted 1,3-cyclopentadiene (hereinafter referred to as cyclopentadiene) such as 1-chlorocyclopentadiene, 1,5-dichlorocyclopentadiene, hexachlorocyclopentadiene, etc. Other cycloalkadienes containing halogen substituents which may be used include pentachlorocyclohexadiene, pentachlorocyclopentadiene, hexabromocyclopentadiene, etc.

A specific example of the two condensations hereinbefore set forth is the condensation of 1,3-cyclopentadiene and maleic anhydride to form norborn-5-ene-2,3-dicarboxylic anhydride. The norborn-5-ene-2,3-dicarboxylic anhydride may then be further condensed with hexachlorocyclopentadiene to form 5,6,7,8,9,9 - hexachloro - 1,2,3,4,4a,5,8,8a - octahydro - 1,4,5,8 - dimethano - 2,3 - naphthalenedicarboxylic anhydride.

Examples of polyhalopolyhydrodimethanonaphthalenedicarboxylic acids or anhydrides thereof which may be prepared include 5,6,7,8,9,9 - hexachloro - 1,2,3,4,4a,5,8, 8a - octahydro - 1,4,5,8-dimethano - 2,3 - naphthalene - dicarboxylic acid 5,6,7,8,9,9 - hexachloro - 1,2,3,4,4a,5, 8,8a - octahydro - 1,4,5,8 - dimethano - 2,3 - naphthalenedicarboxylic anhydride, 5,6,7,8,9,9 - hexabromo - 1,2,3, 4,4a,5,8,8a - octahydro - 1,4,5,8 - dimethano - 2,3 - naphthalenedicarboxylic acid, 5,6,7,8,9,9 - hexabromo - 1,2,3,4,4a,5,8,8a - octahydro - 1,4,5,8 - dimethano - 2,3 - naphthalenedicarboxylic anhydride, etc. The aforementioned chlorine-containing anhydride is illustrated by the following equation:

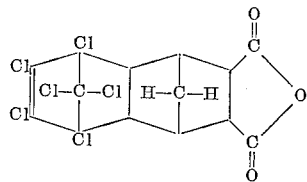

The aforementioned acids and anhydrides thereof may be condensed with a reactive polyfunctional organic intermediate or mixtures of intermediates of the type hereinafter set forth in greater detail to prepare the desired finished product. For example, the acid or anhydride thereof may be admixed with certain intermediates to prepare polyurethane foams which, when utilizing the particular acid or anhydride thereof, will possess an increased resistance to flame as well as an excellent color stability. For example, a polyurethane foam may be prepared by reacting a polyhalopolyhydrodimethanonaphthalenedicarboxylic acid or anhydride and a saturated dicarboxylic acid such as adipic acid, sebacic acid, etc., with a polyol such as 1,2,6-hexanetrial to form a resinous product. This reaction product is then further reacted with an organic polyisocyanate and a foaming agent to prepare the desired polyurethane foam. It is contemplated that the polyurethane foam which is formed may be prepared in either a rigid or flexible state depending upon the particular use to which the end product will be directed.

In addition, the acids or anhydrides thereof may also be reacted with certain polyfunctional organic intermediates to prepare polyester resins which are thereafter utilized in the preparation of construction materials or as plasticizers for polyvinyl compounds. Furthermore, they are also useful in the preparation of alkyd resins which are intermediates in paints, varnishes, etc.

The aforementioned reactive polyfunctional organic intermediates comprise aliphatic and aromatic organic compounds which contain at least two functional substituents, said substituents being selected from the group consisting of R—OH, —NHR,

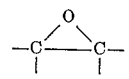

and R—NCO in which the R's are selected from the group consisting of hydrogen, aryl and alkyl radicals containing from 1 up to about 5 carbon atoms or more. Examples of these compounds include glycols such as ethylene glycol, propylene glycol, butylene glycol, diethylene gycol, dipropylene glycol, hydroquinone, cathechol, resorcinol, etc.; amines such as ethylenediamine, propylenediamine, butylenediamine, hexamethylenediamine, meta-phenylenediamine, para-phenylenediamine, 1,3 - cyclohexanediamine, 1,4 - cyclohexanediamine, diaminodiphenylmethane, diaminodicyclohexyl methane, etc. It is also contemplated within the scope of this invention that the particular acids or anhydrides thereof may be reacted along with fatty acids or fatty acid oils such as linseed oil, soya oil, etc. and glycerols to form alkyl resins. It is to be understood that the polyhalopolyhydrodimethanonaphthalenedicarboxylic acids or anhydrides thereof may be reacted with more than one of the above set forth reactive polyfunctional organic intermediates. In addition it is also contemplated within the scope of this invention that the reaction may also be expected in the presence of certain organic substances which may be defined as reactive organic diluents or solvents, said substances including dibasic acids or anhydrides thereof of both saturated and unsaturated nature such as maleic acid, maleic anhydride, fumaric acid, itaconic acid, citraconic acid, phthalic acid, phthalic anhydride, isophthalic acid, hexahydrophthalic anhydride, adipic acid, sebacic acid, etc.; unsaturated esters such as diallyl phthalate, diallyl isophthalate, diallyl maleate, etc.; and lactams, examples of which comprise butyrlactam, caprolactam, etc.

The reactive polyfunctional organic intermediates of the type hereinbefore set forth and the polyhalopolyhydrodimethanonaphthalenedicarboxylic acid or anhydride may be reacted in any manner known in the art, the reaction conditions such as temperature and pressure depending upon the particular compounds undergoing step growth polymerization. For example, a polyhalopolyhydromethanonaphthalenedicarboxylic acid or anhydride may be reacted with a polyhydroxy compound either aliphatic or aromatic in nature, examples including glycols, hydroquinone, catechol, bis-phenol, etc. to prepare polyesters. The polyesters thus prepared may comprise low molecular weight saturated compounds which can be utilized as molding resins, plasticizers, etc. In addition, low molecular weight unsaturated polyesters may be prepared which can then be epoxidized and used as stabilizing plasticizers for polyvinyl chloride resins. In addition, unsaturated polyesters prepared by the above addition of the acid or anhydride with the glycol may be further reacted with vinyl monomers such as styrene to form compounds which are utilizable as thermosetting resins. When the saturated low molecular weight polyester contains —OH terminals the polyester may be admixed with diisocyanate such as, for example, tolylene diisocyanate, diphenylmethane diisocyanate, polymethylene polyphenyl diisocyanate, to form polyurethane intermediates which may then be foamed by the addition of a foaming agent, said foaming agent being capable of liberating gaseous products when reacting with the isocyanate. Examples of foaming agents which may be used include water, tertiary alcohols such as t-butyl alcohol, t-amyl alcohol, acids such as formic acid, polymethylol phenols and ureas, polycarboxylic acids, monocarboxylic acids and anhydrides thereof.

Another method of forming the polyurethane is to react a saturated low molecular weight polyresin containing —OH termination with an organic isocyanate diisocyanate.

In the event that aromatic dihydroxy compounds are admixed with the aforementioned acid or anhydride, the resulting saturated low molecular weight polyester may be reacted with formaldehyde to form a resinous product. If the saturated polyester is of higher molecular weight, that is, a molecular weight above 5000 or more, the resulting product may be used as a molding resin.

The polyhalopolyhydrodimethanonaphthalenedicarboxylic acids or anhydrides thereof may also be reacted with amines to form polyamides. When the resulting polyamide is a low molecular weight compound, that is, a compound having a molecular weight of about 2000 or less, the resulting resins may be used as adhesives, binders in inks, etc. If the resulting polyamide is a high molecular weight and comprises a polyamide linear polymer, the composition of matter may be used as a molding resin, or as a fiber or film former.

It is to be understood that the polyhalopolyhydrodimethanonaphthalenedicarboxylic acid or anhydride thereof may be present in the finished reaction product in various concentrations, ranging from about 5% up to about 50% or more by weight of the finished product.

In all of the reactions involving the aforementioned reactive polyfunctional organic intermediates the polyhalopolyhydrodimethanonaphthalenedicarboxylic acid or anhydride thereof which has been chosen will go into solution much more readily than will other acids or anhydrides of similar nature but which are less than tetracyclic in nature. This solubility of the acid or anhydride will enable the reaction to proceed at relatively lower temperatures and pressures than heretofore used and thus will render the preparation of the desired polymers more economically attractive.

The following examples are given to illustrate the process of the present invention which, however, are not intended to limit the generally broad scope of the present invention in strict accordance therewith.

Example I

A polyester resin is prepared by charging 40 grams (0.645 mole) of ethylene glycol and 68.6 grams (0.645 mole) of diethylene glycol to a flask. The flask is swept with nitrogen and heated with a temperature of between 90° and 100° C. At the end of this time 354 grams (0.81 mole) of 5,6,7,8,9,9-hexachloro-1,2,3,4,4a,5,8,8a-octahydro-1,4,5,8-dimethano-2,3-naphthalenedicarboxylic anhydride and 53.8 grams (0.55 mole) of maleic anhydride are added to the flask. The flask is then heated to a temperature of about 160° C. and maintained at a temperature in the range of from about 165° to about 175° C. for a period of about six hours. At the end of the residence time the resulting resin is recovered.

The polyester resin which is prepared according to the process in the above paragraph is ground up and 350 grams is added to 155 grams of styrene. The mixture is then stirred under nitrogen until the polyester resin goes into solution in the styrene. The resulting styrenated polyester is treated with benzoyl peroxide at 95° C. to yield a clear, tough product that is self-extinguishing when removed from a flame.

Example II

In this example 34 grams (0.55 mole) of ethylene glycol is charged to a reaction vessel which is thereafter swept with nitrogen. The flask is then heated to a temperature in the range of from about 90° to about 100° C. and 218.5 grams (0.5 mole) of 5,6,7,8,9,9-hexachloro-1,2,3,4,4a,5,8,8a - octahydro - 1,4,5,8 - dimethano - 2,3-naphthalenedicarboxylic anhydride is also charged to the flask. Following this 57 grams (0.5 mole) of diethylene glycol which has been preheated to a temperature of about 80° C. is added. The temperature of the flask is then raised and maintained in a range of from about 165 to about 175° C. for a period of about eight hours. At the end of this time 44.5 grams (0.5 mole) of maleic anhydride is added and the reaction is carried out for an additional period of eight hours. At the end of this time the acid number is greatly reduced from the initial acid number, the reaction mixture and flask are allowed to cool to room temperature, said resin solidifying upon cooling.

The resin prepared in the above paragraph is further treated by adding the resin, which has been powdered, to sufficient styrene to make a 66% solution.

Example III

In this example 99 grams (1.3 moles) of propylene glycol is charged to a reaction vessel which is then heated under a nitrogen blanket to about 120° C. At this point there is added an equal molar amount of 5,6,7,8,9,9-hexachloro - 1,2,3,4,4a,5,8,8a-octahydro-1,4,5,8-dimethano-2,3-naphthalenedicarboxylic anhydride slowly while maintaining the temperature above 110° C. After charging about two-thirds of the desired amount of anhydride the temperature is raised to about 145° C. and the remainder of the addition completed. The flask and contents thereof are then heated to a temperature of about 160° C. and maintained thereat for a period of about eight hours. At the end of this time there is added 40.5 grams (0.475 mole) of maleic anhydride and the temperature is again maintained at about 165° C. for an additional eight hours. The resin which is recovered from this treatment is treated with styrene and benzoyl peroxide in a manner similar to that set forth in Example I. The final product will be a clear light amber colored solid which will ignite with difficulty when held on the flame of a Bunsen burner and will be self-extinguishing as soon as it is removed from the action of the direct flame.

Example IV

A mixture of 104 grams of linseed oil, 8.4 grams of glycerol and 0.5 gram of a catalyst comprising litharge mixture is placed in an alkylation flask equipped with a reflux condenser, a stirrer, nitrogen inlet tube, thermometer and a heating mantle. The mixture is heated and the temperature is maintained at approximately 170°–190° C. until transesterification occurs. When this occurs 50 grams of 5,6,7,8,9,9-hexachloro-1,2,3,4,4a,5,8,8a-octahydro-1,4,5,8-dimethano-2,3-naphthalenedicarboxylic anhydride is added and the temperature is maintained in a range of from about 230° to about 235° C. for a period of two hours. The light colored alkyd resin thus formed may be used in paints and varnishes to impart finishes to objects which will have a high hardness and gloss, and in addition are water and alkali resistant as well as possessing excellent flame retarding properties.

Example V

In this example a polyurethane foam is prepared by placing a mixture of 38.8 grams (0.266 mole) of adipic acid, 63.8 grams (0.135 mole) of 5,6,7,8,9,9-hexachloro-1,2,3,4,4a,5,8,8a - octahydro - 1,4,5,8-dimethano-2,3-naphthalenedicarboxylic anhydride and 69.8 grams (0.533 mole) of 1,2,6-hexanetriol in a three-necked alkylation flask provided with a stirrer, nitrogen inlet tube, a short column for water take-off and a condenser. The mixture is then placed under nitrogen and heated to a temperature of from about 155° to about 175° C. for a period of about 3.25 hours. At the end of this time approximately 5 cc. of water is evolved and is removed, the final product comprising a viscous liquid.

To prepare the desired polyurethane foam 30 grams of the above mixture comprising the viscous liquid is admixed with 13 grams of toluene-2,4-diisocyanate in a second flask. After about five minutes the mixture will become homogeneous and heat is evolved, foaming beginning approximately ten minutes after the admixing of the viscous liquid product from the above paragraph and the diisocyanate. Following this, the sample is then cured at a temperature of about 95° C. for one hour, the desired foaming being a rigid white composition of matter which will be self-extinguishing when removed from the direct contact of a flame.

*Example VI*

In this example the polyhalopolyhydrodimethanonaphthalenedicarboxylic acid is used as a co-monomer in the polymerization of lactam. Equi-molecular proportions of caprolactam, hexamethylenediamine and 5,6,7,8,9,9-hexachloro - 1,2,3,4,4a,5,8,8a-octahydro-1,4,5,8-dimethano-2,3-naphthalenedicarboxylic acid are placed in a suitable apparatus provided with heating and nitrogen inlet means. Nitrogen is pressed in and the mixture heated to dissolve the caprolactam. The mixture is then rapidly heated to a temperature of about 255° C. while maintaining the nitrogen pressure, polymerization of the components of the mixture occurring thereat. Upon completion of the desired polymerization reaction the mixture is recovered. This mixture may be fabricated to form a tough fire-resistant film by pressing at an elevated temperature of about 200° C.

*Example VII*

In this example the polyhalopolyhydrodimethanonaphthanenedicarboxylic acid is condensed with an amine to form synthetic polyamides. 5,6,7,8,9,9-hexachloro-1,2,3, 4,4a,5,8,8a - octahydro - 1,4,5,8 - dimethano-2,3-naphthalenedicarboxylic acid is dissolved in an organic solvent. An equi-molecular proportion of hexamethylenediamine dissolved in the same organic solvent is added to the acid solution, said mixing being accompanied by spontaneous warming. After crystallization has occurred the salt is filtered, washed with an organic solvent such as cold absolute alcohol and air dried.

The salt is then charged to a polymer tube which is provided with vacuum means, a nitrogen inlet and heating means. The tube is purged of air by alternatively evacuating to a low pressure and filling with nitrogen. Upon completion of the purge the tube is sealed while reducing the pressure therein. Following this the tube is heated to a temperature of about 215° C. for a period of from about 1.5 to 2 hours. Upon completion of the first heating the tube is allowed to cool to room temperature and opened to remove any uncondensed gases such as ammonia or carbon dioxide which may have been evolved during the heating. The tube is thereafter purged of air in a manner similar to that set forth above, that is, by alternatively evacuating and flushing with nitrogen. Following this the vessel and contents thereof are then heated to a temperature of about 270° C. and after a period of about 1 hour, while heating at atmospheric pressure, the polymer tube is gradually brought to high vacuum by evacuation. The heating is continued under a relatively low pressure of from about 0.2 to 1.5 mm. for an additional period of 1 hour. When maximum melt viscosity has been reached the condensation is discontinued. Following this nitrogen is introduced while the polymer is cooled. The resulting polymer will have a relatively high melt temperature. The films which may be made from the polymer may be obtained by melt methods or from an appropriate solvent such as formic acid, dimethylformamide, etc.

Other polymers of the polyamide type comprising low molecular weight resins which may be used as adhesives in inks may be obtained by condensing the 5,6,7,8,9,9-hexachloro-1,2,3,4,4a,5,8,8a-octahydro-1,4,5,8-dimethano-2,3-naphthalenedicarboxylic acid with diethylenetriamine.

I claim as my invention:

1. An alkyd resin consisting essentially of the reaction product of a saturated aliphatic polyol, a fatty acid or fatty acid oil, and a polyhalopolyhydrodimethanonaphthalenedicarboxylic acid or anhydride thereof.

2. The alkyd resin as set forth in claim 1 further characterized in that the last-named reactant is 5,6,7,8,9,9-hexachloro-1,2,3,4,4a,5,8,8a-octahydro-1,4,5,8-dimethano-2,3-naphthalenedicarboxylic acid.

3. The alkyd resin as set forth in claim 1 further characterized in that the last-named reactant is 5,6,7,8,9,9-hexachloro-1,2,3,4,4a,5,8,8a-octahydro-1,4,5,8-dimethano-2,3-naphthalenedicarboxylic anhydride.

4. An alkyd resin consisting essentially of the reaction product of glycerol, a compound selected from the group consisting of fatty acids and fatty acid oils and 5,6,7,8,9,9-hexachloro-1,2,3,4,4a,5,8,8a-octahydro-1,4,5,8-dimethano-2,3-naphthalenedicarboxylic anhydride.

5. A polyurethane resin consisting essentially of the reaction product of an organic diisocyanate with the reaction product of a saturated aliphatic polyol, a saturated dibasic acid, and a polyhalopolyhydrodimethanonaphthalenedicarboxylic acid or anhydride thereof.

6. The polyurethane resin as set forth in claim 5 further characterized in that the last-named reactant is 5,6,7,8,9,9-hexachloro-1,2,3,4,4a,5,8,8a-octahydro-1,4,5,8-dimethano-2,3-naphthalenedicarboxylic acid.

7. The polyurethane resin as set forth in claim 5 further characterized in that the last-named reactant is 5,6,7,8,9,9-hexachloro-1,2,3,4,4a,5,8,8a-octahydro-1,4,5,8-dimethano-2,3-naphthalenedicarboxylic anhydride.

References Cited by the Examiner

UNITED STATES PATENTS

| | | | |
|---|---|---|---|
| 1,098,728 | 6/1914 | Howell | 260—22 |
| 2,635,977 | 4/1953 | Lidov | 260—346.6 |
| 2,779,701 | 1/1957 | Robitschek et al. | 260—486 |
| 3,055,869 | 9/1962 | Wilson et al. | 260—22 |
| 3,061,492 | 10/1962 | Singleton et al. | 260 |
| 3,098,047 | 7/1963 | Tapas et al. | 260—22 |
| 3,105,087 | 9/1963 | Roberts et al. | 260—468 |
| 3,196,191 | 7/1965 | Haigh et al. | 260—75 |

OTHER REFERENCES

Riemschneider et al.: Monatsheft fur Chemie, vol. 91 (1960), pp. 1025–1026. QD1M73 copy in Scientific Library.

LEON J. BERCOVITZ, *Primary Examiner.*

R. W. GRIFFIN, *Assistant Examiner.*